2 Sheets--Sheet 1.
B. F. HALEY.
Machines for Sawing Laths.
No. 155,832. Patented Oct. 13, 1874.
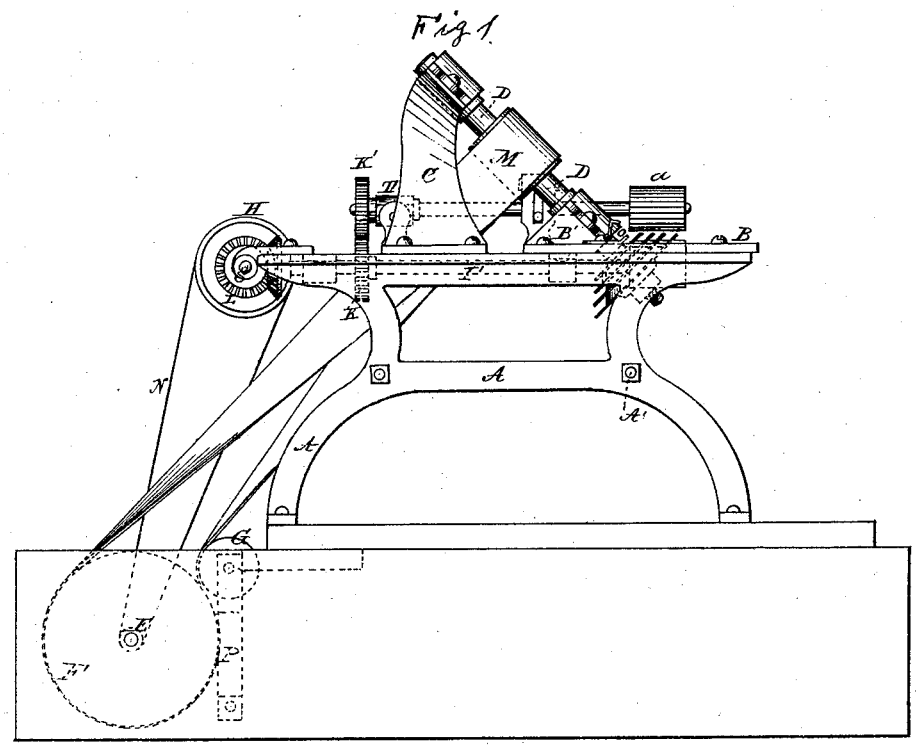
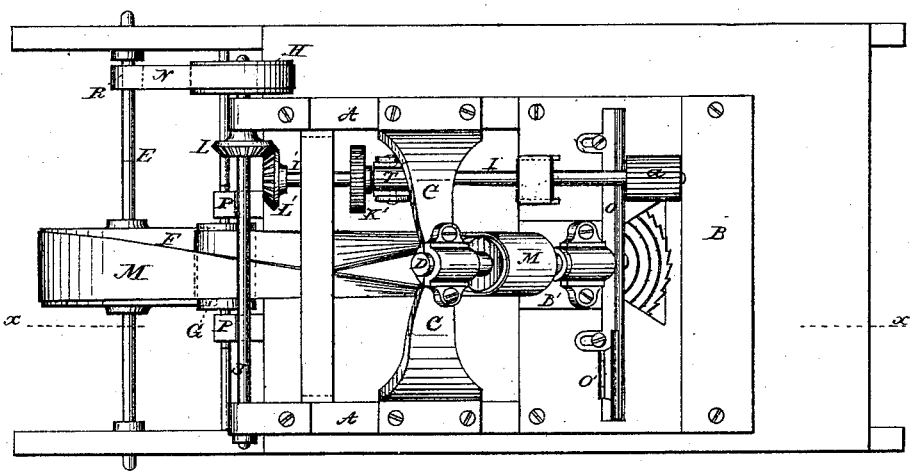
Witnesses: Fig. 2. Inventor:

B. F. HALEY.
Machines for Sawing Laths.

No. 155,832. Patented Oct. 13, 1874.

Witnesses:

Inventor:
B. F. Haley

UNITED STATES PATENT OFFICE.

BENJAMIN F. HALEY, OF NEW MARKET, NEW HAMPSHIRE.

IMPROVEMENT IN MACHINES FOR SAWING LATHS.

Specification forming part of Letters Patent No. 155,832, dated October 13, 1874; application filed October 6, 1874.

*To all whom it may concern:*

Be it known that I, BENJAMIN FRANKLIN HALEY, of New Market, in the county of Rockingham and State of New Hampshire, have invented certain new and useful Improvements in Machines for Sawing Laths; and I do hereby declare that the following is a full, clear, and exact description thereof, that will enable others skilled in the art to which it appertains to make and use the same, reference being had to the accompanying drawings, and to the letters of reference marked thereon, which form a part of this specification.

Figure 3:
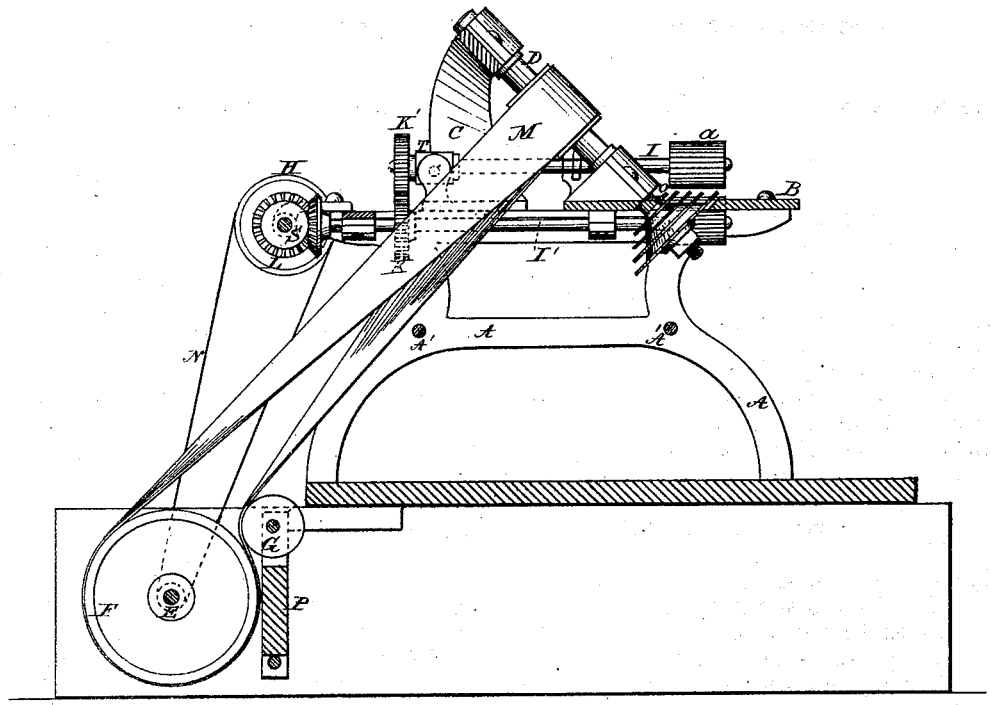
Figure 4:
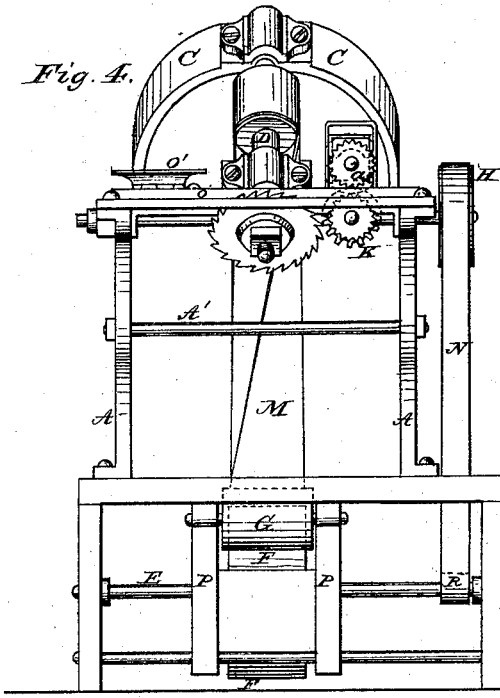

Figure 1 is a side view of my lath-machine. Fig. 2 is a plan view of the same. Fig. 3 is a sectional view on the line $x\ x$ of Fig. 2; and Fig. 4 presents an end view of the machine, showing the position of the saws with relation to the feed-rolls.

This invention relates to the manner of running a series of circular saws on an inclined arbor by a belt from a horizontal pulley and shaft; also, to the arrangement of gearing for driving the feed-rolls of a machine for sawing laths of rhomboidal section, as will be hereinafter fully described.

A represents the frame of the machine, constructed preferably of cast-iron, and formed of two side pieces, which are rigidly connected by the braces A', table B, and bridge C. Upon the table B is secured an angular bearing-block, B', which, together with the peculiarly-formed bridge C, form the supports for the journal-boxes, in which revolves the saw-arbor D. This arbor is constructed so as to carry a gang of circular saws, of which the outer one is the largest, the others diminishing in size, according to the angle with the table at which the arbor is placed, so as to bring their peripheries nearly upon a horizontal line, or parallel with the surface of the saw-table.

The belt M passes around the pulley on the arbor D over the guide and tension pulley G and around the driving-pulley F, which is secured upon the shaft E, thus giving motion to the saws.

A feed-pulley, R, gives motion to the belt N, and this belt passing over the pulley H upon the shaft S, revolves the shaft together with the bevel-gears L L', the latter of which is keyed upon one end of the shaft of the lower feed-roll I', and this shaft in turn communicates its motion to the upper feed-roll by means of the two spur-gears K K'.

The journal-box T of the upper roll is hung upon pivots, so as to allow the roll a limited amount of vertical movement, in order that it may adjust itself to any inequality in the thickness of the material to be operated upon.

An adjustable gage, O, is secured upon the table, having its face at the same angle to the table as the saws upon the arbor D, so that after the first cut is made from the bolt, by which the proper bevel is given to its edge, the operation may be continued without further loss of material, the bolt at each cut being pressed up snugly against the gage O; but in order to make the first cut, or if the bolt be very narrow, an additional gage, O', is used.

This gage is attached to the bed by pivots, and its connections are of such a character that it may be turned backward to the rear of the inclined gage O, or formed falling in front of it upon the table, and presenting a vertical face to the lath-bolt.

It will be seen that the guide and tension pulley G is journaled in the vertically-sliding frame P, thus enabling the operator to adjust it in any desired position.

The construction and arrangement of parts, as above described, has been found to form a machine possessing great efficiency, and which surmounts many of the difficulties heretofore encountered in machines of a like class.

I am aware that a patent was granted to James H. Butler, February 27, 1872, for an improvement in lath-machines; but the arrangement of devices therein shown I do not claim.

What I do claim as my invention, and desire to secure by Letters Patent, is—

1. The driving-shaft E with its pulley F, belt M, guide and tension pulley G, and inclined saw-arbor D, in combination with the feed-rolls I I', and their driving mechanism, substantially as shown and described.

2. The adjustable inclined guide O and pivoted guide O', in combination with the saw-table B and inclined saw-arbor D, in the manner and for the purpose specified.

In testimony that I claim the foregoing I have hereunto set my hand this 3d day of April, 1873.

BENJAMIN F. HALEY.

Witnesses:
C. D. IRELAN,
M. H. CHANDLER.